United States Patent [19]
Schröder et al.

[11] Patent Number: 5,706,396
[45] Date of Patent: Jan. 6, 1998

[54] ERROR PROTECTION SYSTEM FOR A SUB-BAND CODER SUITABLE FOR USE IN AN AUDIO SIGNAL PROCESSOR

[75] Inventors: Ernst F. Schröder, Hanover; Georg Plenge, Egling, both of Germany; Leon Maria van de Kerkhof, WT Eindhoven, Netherlands

[73] Assignee: Deutsche Thomson-Brandt GmbH, Villingen-Schwenningen, Germany

[21] Appl. No.: 281,734

[22] Filed: Jul. 27, 1994

Related U.S. Application Data

[63] Continuation-in-part of PCT/EP93/00097, Jan. 18, 1993, published as WO93/15562, Aug. 5, 1993.

[30] Foreign Application Priority Data

Jan. 27, 1992 [DE] Germany .................. 42 02 140.5
Jan. 31, 1992 [DE] Germany .................. 42 02 654.7

[51] Int. Cl.$^6$ ..................................... G10L 9/00
[52] U.S. Cl. ................. 395/2.37; 395/2.35; 395/2.3; 395/2.25
[58] Field of Search ........................ 395/2.1, 2.35; 371/37.2, 46; 381/31–38

[56] References Cited

U.S. PATENT DOCUMENTS

| | | | |
|---|---|---|---|
| 4,447,902 | 5/1984 | Wilkinson | 371/39 |
| 4,649,542 | 3/1987 | Nishimura et al. | 371/39 |
| 4,748,628 | 5/1988 | Moriwaki | 371/40 |
| 5,142,656 | 8/1992 | Fielder et al. | 381/37 |
| 5,172,380 | 12/1992 | Odaka | 371/37 |
| 5,323,396 | 6/1994 | Lokhoff | 395/2.1 |
| 5,406,632 | 4/1995 | Sogo et al. | 371/46 |
| 5,432,800 | 7/1995 | Kuroda et al. | 371/37 |
| 5,440,584 | 8/1995 | Wiese | 375/242 |

FOREIGN PATENT DOCUMENTS

| | | | |
|---|---|---|---|
| 3506912 | 2/1985 | Germany | H03M 7/30 |
| 3621513 | 6/1986 | Germany | H03M 7/30 |
| 3639753 | 11/1987 | Germany | G10L 7/02 |

OTHER PUBLICATIONS

Speech Communication, vol. 7, No. 2, Jul. 1988, Amsterdam NL, pp. 193–207, Lazzari et al "Comparison of two speech Codecs for DMR Systems".

ICC'86 Toronto, vol. 1(3), Jun. 1986, IEEE, NY USA pp. 23–27, Aoyama et al "Applications of 7 kHz–band Digital Speech Signal at 64 kbps to ISDN and non–ISDN".

Patent Abstracts of Japan, vol. 13, NO. 16, 13 Jan. 1989 and Japanese Pat. 63–221728 (NEC Corp.).

(List continued on next page.)

Primary Examiner—Allen R. MacDonald
Assistant Examiner—Vijay B. Chawan
Attorney, Agent, or Firm—Joseph S. Tripoli; Eric P. Herrmann; Ronald H. Kurdyla

[57] ABSTRACT

In a digital audio-signal transmission process, digital audio signals are coded in sub-bands. One or more scaling factors are determined for each sub-band. The coded signals and scaling factors are transmitted in data blocks, then decoded and reproduced at a receiver. The data block contains several types of information including a header, error processing information, a CRC (cyclic redundancy check) protection word, audio information including a bit allocation table, scaling factor selecting information, one or several scaling factors per transmitted sub-band, filler bits, and supplementary information with audio-signal-dependent supplementary information. To improve the protection of the above-described sub-band coded audio signals against transmission errors, supplementary error protection information or an error protection bit is added to the data block instead of filler bits, in order to protect the scaling factors. Acoustically uncomfortable play-back disturbances caused by scaling factor errors are thus eliminated. The invention may be used in digital audio broadcast (DAB), DAB-receivers, recorders and play-back systems.

20 Claims, 3 Drawing Sheets

OTHER PUBLICATIONS

Charbonnier et al., "Sub-band ADPCM coding for high quality audio signals", ICASSP'88: Acoustics, Speech & Signal Processing Conference, pp. 2540–2543, Feb. 1988.

Gilloire et al., "Adaptive filtering in sub bands", ICASSP'88: Acoustics, Speech & Signal Processing Conference, pp. 1572–1575, Feb. 1988.

Varma et al., "Use of error control coding and antenna diversity to improve performance of sub-band coding", Vehicular Technology, 1988 conference, pp. 153–157, Sep. 1988.

Mazor et al., "Transform subbands coding with error control", ICASSP'89: Acoustics, Speech & Signal Processing Conference, pp. 172–175, Feb. 1989.

Yong et al., "Subband vector excitation coding with adaptive bit-allocation", ICASSP'89: Acoustics, Speech & Signal Processing Conference, pp. 743–746, Feb. 1989.

Veldhuis et al., "Subband coding of digital audio signals without loss of quality", ICASSP'89: Acoustics, Speech & Signal Processing Conference, pp. 2009–2012, Feb. 1989.

van der Waal et al., "Subband coding of stereophonic digital audio signals", ICASSP'91: Acoustics, Speech & Signal Processing Conference, pp. 3601–3604, Jul. 1991.

ERROR PROTECTION SYSTEM FOR A SUB-BAND CODER SUITABLE FOR USE IN AN AUDIO SIGNAL PROCESSOR

This is a continuation-in-part of application Ser. No. PCT/EP93/00097, filed 18 Jan. 1993, published as WO93/15562 Aug. 5, 1993 entitled ERROR PROTECTION IN A SUBBAND CODER by Ernst F. Schröder et al.

The invention relates to a system or method of processing digital audio signals, and to a device for receiving processed signals.

BACKGROUND OF THE INVENTION

From DE-OS 3506912, DE-OS-3621513 and DE-3639753, it is known to subject sampled, digitized audio signals to partial-band coding, hereinafter referred to as sub-band coding. The audio signals are divided into time segments (so-called "windows") corresponding to 1152 sampling values (24 msec at a sampling frequency of 48 kHz). After developing 27 subbands, for example, up to three scaling factors are specified for each subband. These scaling factors are quantised (using e.g. 6 bits), and are transmitted at a specific position in a known data frame, i.e., a data block. The number and significance of the scaling factors is likewise transmitted at a specific position in the data block.

Each individual data block forms a part of a bit stream divided into sequential data blocks. Each block normally comprises a header, an optional error check code field, an audio data field and an ancillary data field.

After being scaled by using the scaling factors, the sampling values in each sub-band are quantised using a predetermined number of bits, and are transmitted at a specific position in a data block. This specific position is preferably the audio data field.

The number of bits used is likewise transmitted in coded form at a specific position in the audio data field of the data block, as a bit allocation table.

A header, which includes information relating to the audio signal and coding (e.g. stereo/mono, sampling frequency, preemphasis, data rate) forms the beginning of the data block.

Furthermore, some bits may be available in the ancillary data field at the end of the frame for ancillary information relating to the music selections (e.g. the source, the title, text).

The number of bits to be used per sub-band for coding the sampling values is determined in a parallel operation with the aid of psycho-acoustic factors. The total number of bits allocated to the sub-bands has an upper limit, since each data block can only contain a specific number of bits. This number depends on the desired data transmission rate (e.g. 6144 bits at 256 kbits/sec). The number of bits used for other data fields within the frame need to be subtracted from this maximum number.

Not all of the bits of a data block contain meaningful items of information. There usually remains a series of meaningless "stuffing" bits after the bits used for the sampling values. The number of stuffing bits may be controlled by making appropriate assumptions when calculating the total number of allocatable bits. In particular, the number of stuffing bits may be kept greater than necessary.

If transmission errors occur, the behavior of the coded audio signal as described above may vary according to which parts of the data block were modified.

In particular, errors in the header, the bit allocation table and the scaling factor selection information may produce significant disturbances in the decoded signal. For this reason, an error protecting word (16 bit cyclic redundancy check, CRC) is optionally but frequently provided. By using this error protection word, an error in these regions of the data block can be detected, and appropriate protective measures can be initiated at the receiver (e.g., error concealment).

Transmission errors within the coded audio sampling values in the audio data field are of little consequence. Even at very high error rates (e.g., $10^{-2}$), no special error protection is required.

SUMMARY OF THE INVENTION

The disclosed invention is based on the recognition that scaling factor errors have a very disturbing effect during sound reproduction. Scaling factor errors may produce very loud "whistling" sounds at the output of a receiver. Consequently, in order to protect a user's hearing or loudspeaker components from damage, supplementary error protection, or at least detection of scaling factor error, is necessary so that appropriate error concealment measures can be initiated.

In accordance with the principles of the present invention, improved protection against transmission errors of sub-band coded audio signals is provided through a method of processing digital audio signals comprising the steps of:
1. sub-band coding the audio signals,
2. generating at least one scaling factor for each sub-band, and
3. generating data blocks comprising:
   (a) a header including control information,
   (b) a first error checking and/or correction code relative to the header,
   (c) an audio data field including scaling factors,
   (d) an ancillary information field including ancillary information relating to the audio signals and,
   (e) a second error checking and/or correction code for protecting the scaling factors, the second code being inserted near the end of data blocks in the vicinity of the ancillary information field.

According to a feature of the invention, the step of developing data blocks includes the step of deriving the second code only from the most significant bits of the scaling factors.

According to another feature of the invention, the second error checking and/or correction code of a given data block is associated with the scaling factors of the following data block.

According to an additional feature of the invention, the step of forming data blocks includes the step of forming groups of scaling factors within a data block, a word of the second error checking and/or correction code being associated respectively with each of such groups.

According to a further feature of the invention, the step of forming data blocks includes the step of jointly protecting the first and second channels of a stereo or two sound channel signal by the second error checking and/or correction code.

According to another feature of the invention, the step of forming data blocks comprises the step of replacing stuffing bits with the second error checking and/or correction code.

According to an additional feature of the invention, in the step of generating data blocks, the header includes at least one of the following: synchronising information, information relating to the bit rate, and information relating to the sampling rate.

According to another feature of the invention, the first and second error checking and/or correction codes are cyclic redundancy check codes (CRC).

The disclosed invention also concerns a method of decoding digital audio signals generated according to the signal processing method described above, the method of decoding comprising the steps of:

detecting a significant scale factor level transition, comparing this level transition with a statistically expected transition, the detected transition being considered erroneous if a deviation from the expected transition is detected, and correcting or concealing erroneous scale factor level transitions.

According to an aspect of the invention, the step of detecting the transition comprises the step of comparing a change in scale factor level to a threshold.

According to another aspect of the invention, the step of comparing the transition with a statistically expected transition comprises the step of determining whether the transition is followed by a transition of opposite direction/polarity.

The invention also concerns apparatus for decoding a digital audio signal obtained through a method of processing digital audio signals comprising steps (1), (2) and (3) noted previously. The apparatus comprises:

a memory for storing the second error checking and/or correction codes, and error processing means for evaluating and correcting/concealing erroneous scaling factors using the second code, the means for correcting/concealing being connected to the memory.

According to a feature of the invention, the apparatus also comprises a memory for storing the received audio signal or selected components of this signal, and means for detecting a transition in the scale factor level. The detecting means compares the transition with a statistically expected value, the transition being considered erroneous if a deviation from expected transition value is detected.

The invention also concerns a medium for storing a coded digital audio signal, where the coded audio signal has been produced by a method comprising steps (1), (2) and (3) noted previously.

BRIEF DESCRIPTION OF THE DRAWINGS

In the drawings:

FIG. 1a is a data block format for audio signal transmission.

FIG. 1b shows details of the block format in FIG. 1a.

DETAILED DESCRIPTION OF THE DRAWINGS

As one measure of protection in accordance with the invention, supplementary error protecting information is inserted into a data block for protecting the audio scaling factors. For this purpose, one (or more) CRC data words may be used for detecting one or more transmission errors within the scaling factors.

Since it has been observed that a transmission error within the scaling factors may lead to noticeable audible disturbance if one or more of the three MSBs (Most Significant Bits) of the scaling factors are interfered with, it is sufficient to monitor the three MSBs of the scaling factors by means of a CRC. Further investigations have shown that it may not be expedient to protect all of the scaling factors for all of the sub-bands together. Instead, it may be sufficient to form, e.g., four groups and to monitor the scaling factors of only a certain number of sub-bands with the aid of one CRC. For example, for a total of 27 subbands, one can use the following sub-band groupings: 2, 4, 8, 13, or 4, 4, 8, 11, or 1, 1, 2, 4, 8, 11, or some other grouping of the 27 sub-bands. In addition, for a coded stereo signal, the scaling factors for the left and right channels can be protected together.

In order to compatibly insert the supplementary CRC words into the known data blocks, the words are placed at the end of the data block in the vicinity of the stuffing bits. The calculations for the bit allocation ensure that there will be sufficient space for four CRC words each having 8 bits, for example.

If no ancillary information relating to an audio signal is present, then the supplementary CRC words are located at the end of the data block. However, if such ancillary information is present, then the supplementary CRC words are inserted directly in front of the ancillary information.

The detection of transmission errors within the scaling factors occurs if both the scaling factors and the supplementary CRC words are available at the receiver. Since the supplementary CRC words are located near the end of the data block, all of the data in the data block is initially stored in a buffer before decoding can begin. This can be avoided if the CRC words inserted into a given data block correspond to the scaling factors of the immediately succeeding data block. This increases the complexity of the transmitter, which is tolerable for broadcasting equipment, and advantageously produces a noticeable reduction of memory requirements at the receiver.

Figures 1A, 1B:
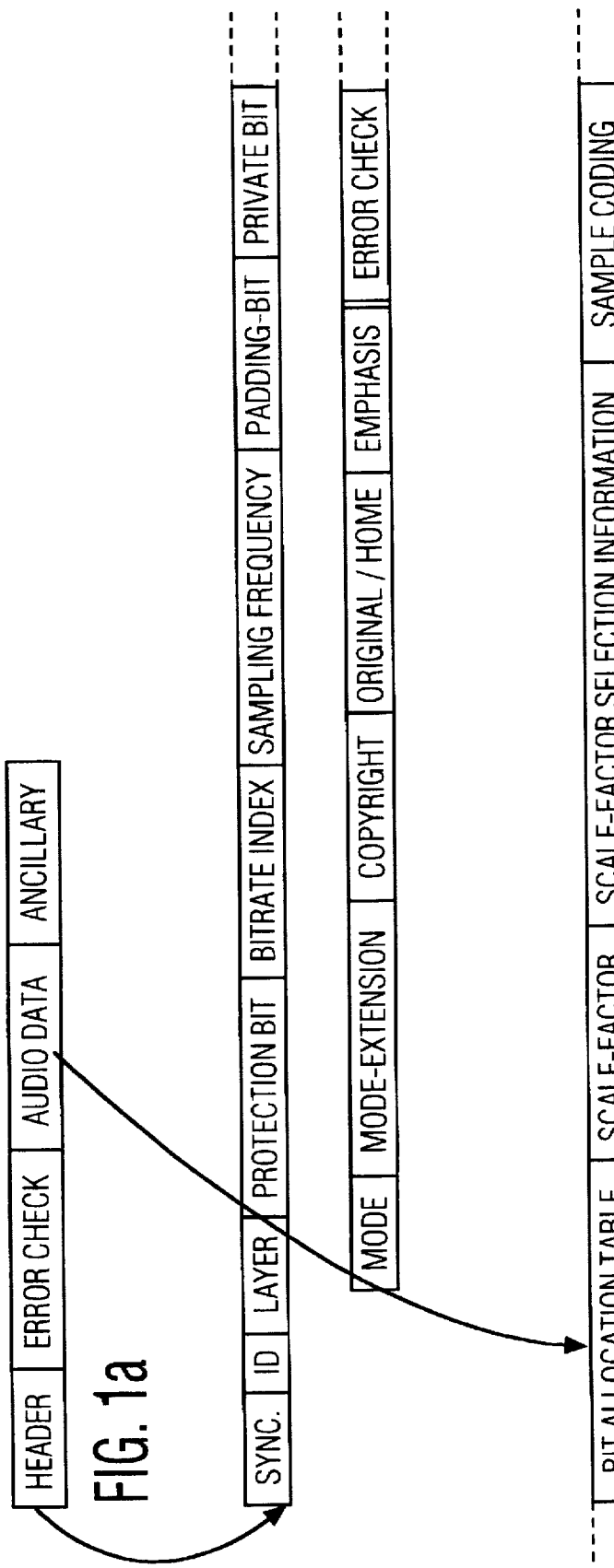

FIG. 1a shows a general view of the format of a main data block which is transmitted as part of a bit stream of digitized audio signals. The block comprises a header, an error checking code field ("Error Check"), an audio data field, and an ancillary data field containing information relating to the audio signal. For transmission, individual bits are interleaved within a block or with the bits of another block, and may be optionally scrambled.

FIG. 1b shows details of the block format of FIG. 1a. A 12 bit synchronising word (SYNC) is placed at the beginning of the header. All of the bits of this word have a binary value "1". The synchronising word is followed by:

an identification bit (ID), a two bit item of "Layer" information regarding the data reduction algorithm that has been selected, or the psychoacoustic model chosen for the coded audio signals, a protection bit including information as to whether or not redundant data is being transmitted, a bit rate index (four bits) including information regarding the bit rate (such as 32 kbit/sec or 128 kbit/sec) that was selected for the coding process, information (two-bits) regarding the sampling frequency, e.g., 44.1 kHz, that was selected for sampling the audio signals, a Padding Bit which is at logical "1" for a sampling rate of 44.1 kHz, a Private Bit (not defined)

information (two bits) regarding the selected mode, e.g., stereo, stereo intensity, mono, etc., Mode Extension Information (two bits) regarding the selected sub-bands for the intensity stereo mode, a Copyright Bit, wherein logical "1" means "Protected by copyright", an Original/Home Bit, including information as to whether the transmitted audio signals originate from an original recording, a live transmission or a copy, and emphasis information (two bits).

The error checking component (Error Check) comprises a 16 bit CRC parity check word which is provided in particular for the detection of transmission errors in the header, especially errors in the synchronising word, the scaling factor selection information and the bit allocation table in the audio data field.

The audio data field comprises a bit allocation table, scaling factor information, scaling factors, sample coding information, sampling values, stuffing bits and additional error protection information (scale factor protection bits) at the end of the audio data field or at the end of the data block. The position of the stuffing bits and of the additional error protection information may also be interchanged as shown in FIG. 1b. The ancillary data field relating to the audio signal is defined by the user.

The additional error protection information in the data block, which is inserted at the end of the data block before the ancillary data information relating to the audio signal, is especially relevant for the protection of data in the following data block. It preferably serves for the protection of the scaling factors transmitted in the following data block. It is expedient to have the additional error protection information protect the MSBs of the scaling factors. If the number of scaling factors per sub-band is three, then only the three MSBs have to be protected. Preferably, the additional error protection information provides combined protection of the scaling factors of the first and second channels of a stereo system, or a two channel sound system. The additional error protection information includes one or more CRC words, and replaces the stuffing bits provided at the positions in the data block allocated thereto. It is especially advantageous to have the additional error protection information include four CRC words, each of which protects the scaling factors of a number of sub-bands.

According to a further aspect of the invention, additional detection of transmission errors is provided. In many cases, the detection of transmission errors within the whole or within parts of the useful signal is not possible because no error protection is present, the error protection is insufficient, or the error protection is related to the whole signal and interference with specific signal components cannot be identified separately.

A floating point technique is often used for the digital coding of audio signals. Frequently, displacements of the decimal point are only permitted to a limited extent, for example 500 times in one second. The value in front of the decimal point is then constant for a specific period of time, e.g. for 2 msecs. This value is referred to as a scaling factor. The scaling factor is digitally coded, usually provided with a high degree of error protection, and transmitted as a signal component within the digital bit stream.

Certain statistical features of an analog audio signal are relied upon for monitoring the digitally coded, transmitted and decoded digital audio signal at a receiver. One of the most important statistical features of natural audio signals is that rapid changes occur from low to high signal levels rather than from high to low signal levels. A further feature of audio signals is that frequency response changes usually take place slowly rather than abruptly, and that they usually appear at the same time as large changes in level of the overall signal. This applies in particular to closely adjacent spectral components of the signal.

From the characteristics of the level of an audio signal it can be expected that scaling factor values usually change slowly, and that rapid changes (discontinuities) only occur from low to high level values. These characteristics can produce the following situations.

Figure 2A:
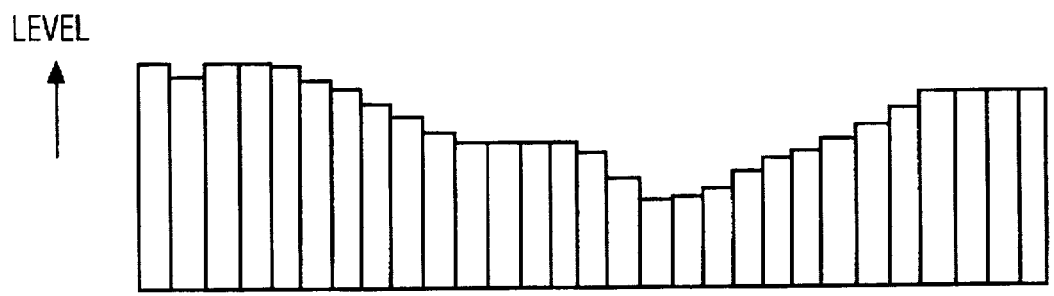
FIGS. 2a–2d show waveforms with respect to scaling factors of a digitally coded audio signal transmitted without errors (FIGS. 2a and 2b) as well as with errors (FIGS. 2c and 2d).
Figure 2B:
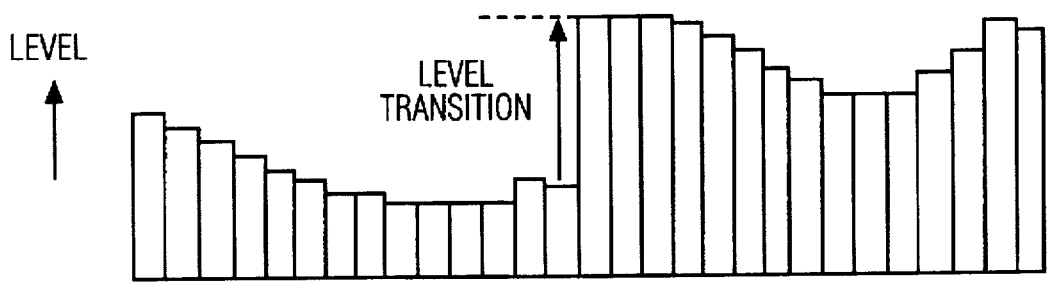

1. Normal changes in the scaling factor level (FIG. 2a), wherein the height of each illustrated column indicates the instantaneous level value which applies for a specific period of time of 2 msec for example.
2. Normal changes in the scaling factor level with a normal level discontinuity (level transition) (FIG. 2b).
3. Probably erroneous scaling factor(s) indicated by isolated level peaks (FIG. 2c), where the scaling factor subject to error is shown as hatched.
4. Probably erroneous scaling factor(s) indicated by isolated level decreases (FIG. 2d), where the scaling factors subject to error are shown as hatched.

Figure 2C:
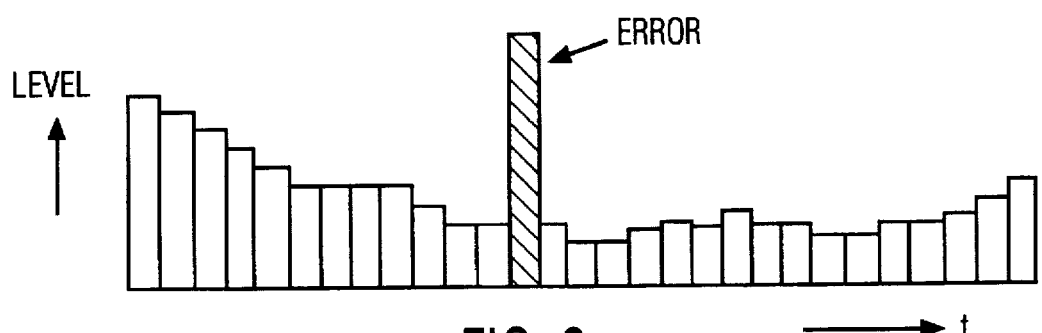
Figure 2D:
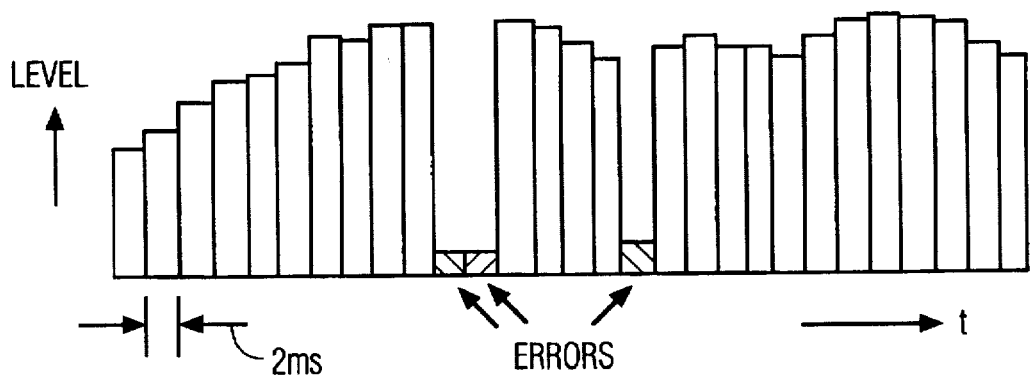

In order to detect an erroneous scale factor level transition in accordance with FIG. 2c or 2d, the change in level is compared with a statistically expected value. Only a change in level above a defined threshold is regarded as a significant change in level. The levels before and after the level transition are used as a basis for determining the erroneous nature of the transition. In the case of FIGS. 2c and 2d, this means that after the occurrence of the transition in level marked by the hatching, it is determined whether a new level transition occurs in the opposite direction, immediately after the level transitions that are under observation. A scaling factor detected or categorised as containing an error in this manner can be easily replaced by a correct scaling factor. This may be done either through extrapolation (repetition of the preceding scaling factor) or by interpolating scaling factors assumed to be correct.

The described error detecting process can be employed at a receiver using relatively simple and inexpensive circuits, since the receiver need only determine whether or not, after a level transition, a new oppositely directed level transition occurs.

Storage media, e.g. optical storage media such as a compact disc or recordable optical storage media such as a magneto-optic disc or chip cards in which the sub-band coded digitized audio signals are stored, may use signals provided in accordance with the disclosed method.

Apparatus for receiving and processing the audio signal comprises a memory for storing the received audio signal or selected components of this signal. It also comprises level change detecting means, which in the event of the occurrence of changes in the level of the received audio signal or in selected components of this signal, compare the signal waveforms before and after the relevant change in level with signal waveforms derived from statistical characteristics of the signal. The changes in level under observation are considered as errors if their value deviates from a statistically expected signal waveform which may be stored in memory.

Figure 3:
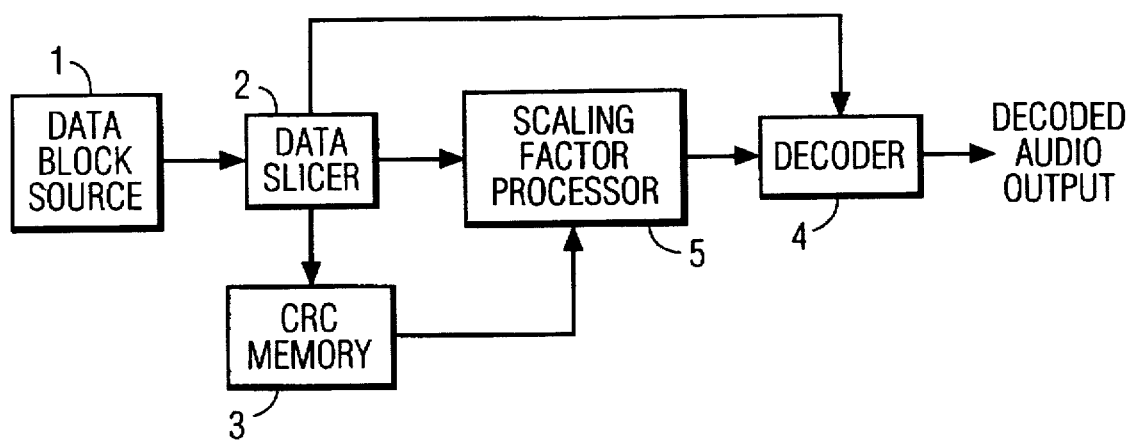
FIG. 3 is a block diagram of a portion of a receiver apparatus according to the invention for decoding an audio signal.

FIG. 3 is a block diagram of a portion of an audio signal receiver and processor. A source of data blocks 1 containing audio information provides data blocks to a data slicer 2, which may include a demultiplexer for separating the contents of the data fields of each data block and providing the separated components to associated signal processing circuits. Source 1 illustratively may include a data storage medium with associated data reading means, or it may include a tuner and demodulator network, depending on the application.

Data slicer 2 couples separated CRC words to a memory 3, separated coded (audio) sampling values to a decoder 4, and separated scaling factors to a scaling factor processor 5. Unit 5 includes scaling factor evaluation and scaling factor error correction/concealment networks. Stored CRC words from memory 3 are used by unit 5 to evaluate and correct input scaling factors from unit 2. Processor 5 also detects significant transitions of the scaling factors, and evaluates these transitions. If a scaling factor is determined to be erroneous, processor 5 takes appropriate corrective action, e.g., interpolation or re-using a previous correct value, to obtain a new, more appropriate value for the current scaling factor. The new scaling factor is then conveyed to decoder 4, which restores sample values using scaling factors from unit 5 together with other predetermined factors including decoding algorithms. The receiver may implement either error correction or concealment or both.

We claim:

1. A method of processing digital audio signals comprising the steps of:
   sub-band coding said audio signals,
   generating a scaling factor for sub-band coded audio signal components; and
   generating data blocks comprising:
   (a) a header including control information,
   (b) a first error processing code for said header,
   (c) an audio data field including said scaling factors,
   (d) an ancillary information field including ancillary information relating to said audio signals, and
   (e) a second error processing code for protecting said scaling factors, said second code being inserted near the end of said data blocks in a region that incorporates items of said ancillary information.

2. A method according to claim 1, wherein
   said step of generating said data blocks includes the step of deriving said second code from the most significant bits of said scaling factors.

3. A method according to claim 1, wherein
   said second error processing code of a given data block is associated with scaling factors of a following data block.

4. A method according to claim 1, wherein
   said step of generating data blocks includes the step of forming groups of scaling factors within a data block, a word of said second error processing code being associated respectively with each of said groups.

5. A method according to claim 1, wherein
   said step of generating data blocks includes the step of jointly protecting first and second channels of a two channel signal by said second error processing code.

6. A method according to claim 1, wherein
   said step of generating data blocks comprises the step of replacing stuffing bits with said second error processing code.

7. A method according to claim 1, wherein
   said header includes at least one of the following types of information: synchronising information, information relating to bit rate, information relating to sampling rate.

8. A method according to claim 1, wherein
   said first and second error processing codes are cyclic redundancy check codes (CRC).

9. A method of decoding digital audio information comprising sub-band audio signals; a scaling factor for sub-band coded audio signal components; and data blocks comprising (a) a header including control information, (b) a first error processing code relative to said header, (c) an audio data field including said scaling factors, (d) an ancillary information field including ancillary information relating to said audio signals and (e) a second error processing code for protecting said scaling factors, said code being inserted near the end of said data blocks in a region that incorporates items of said ancillary information, wherein said method of decoding comprises thesteps of:
   detecting a scaling factor level change,
   comparing said change with a statistically expected level change, said detected level change being considered erroneous if a deviation from said expected change is detected, and
   compensating for an erroneous scale factor change.

10. A method according to claim 9, wherein
    said step of detecting said level change comprises the step of comparing a change in amplitude of said scaling factor to a threshold.

11. A method according to claim 9, wherein
    said step of comparing said detected level change with a statistically expected level change comprises the step of determining if said detected change is followed by a level change of opposite direction.

12. Apparatus for decoding digital audio information comprising sub-band audio signals; a scaling factor for sub-band coded audio signal components; and data blocks comprising (a) a header including control information, (b) a first error processing code relative to said header, (c) an audio data field including said scaling factors, (d) an ancillary information field including ancillary information relating to said audio signals and (e) a second error processing code for the protecting said scaling factors, said second code being inserted near the end of said data blocks in a region that incorporates items of said ancillary information, said apparatus comprising:
    a source of said data blocks;
    means coupled to said source for extracting said second code and said scaling factors from said data blocks;
    means responsive to said scaling factors and to said second code for compensating for erroneous scaling factors using said second code; and
    means responsive to said scaling factors for decoding said coded audio signals.

13. Apparatus according to claim 12, and further comprising:
    means for detecting significant level transitions of said scaling factors, wherein a significant level transition is considered erroneous if followed by a second transition in an opposite direction.

14. A medium storing method for producing a coded digital audio signal, said method comprising the steps of:
    sub-band coding said audio signals,
    generating a scaling factor for sub-band coded audio signal components; and
    generating data blocks comprising:
    (a) a header including control information,
    (b) a first error processing code relative to said header,
    (c) an audio data field including said scaling factors,
    (d) an ancillary information field including ancillary information relating to said audio signals and
    (e) a second error processing code for protecting said scaling factors, said second code being inserted near the end of said data blocks in a region that incorporates items of said ancillary information.

15. A method of communicating a digital audio signal, comprising the steps of:

(a) sub-band coding said audio signal, wherein at least one scale factor is associated with a sub-band;

(b) transmitting said sub-band coded audio signal in successive data frames, wherein a data frame includes:

(a1) a header including control information;

(a2) an audio data code including:
a bit allocation table;
scale factor selection information;
a scale factor; and
sampling values associated with said sub-bands;

(a3) error detection data including a first error protection code, wherein said first protection code is a Cyclic Redundancy Check (CRC) code for detection of transmission errors in said header, said scale factor selection information and said bit allocation table; and (a4) an ancillary information field containing information concerning said audio data signal and including a second CRC protection code for protecting the MSB's of said scale factor, wherein said second protection code is inserted at the end of said data frame in a region of said data frame that incorporates items of said ancillary information.

16. A method according to claim 15, wherein said header control information includes a synchronizing word and at least one of:

bit rate information;

sampling information; and mode information.

17. A method according to claim 15, wherein said error detection data further includes an error correction code.

18. A method of receiving a sub-band coded digital audio signal organized in successive data frames, wherein at least one scale factor is associated with a sub-band, said method comprising the steps of:

(a) decoding information in a data frame of said sub-band coded audio signal, including:

(a1) a header including control information;

(a2) an audio data code including:
a bit allocation table;
scale factor selection information;
a scale factor; and
sampling values associated with said sub-bands;

(a3) error detection data including a Cyclic Redundancy Check (CRC) first error protection code for detecting transmission errors in said header, said scale factor selection information and said bit allocation table; and (a4) an ancillary information field containing information concerning said audio data signal and including a second CRC protection code for protecting the MSB's of said scale factor, wherein said second protection code is inserted at the end of said data frame in a region of said data frame that incorporates items of said ancillary information; and (b) reproducing audio information using an item of decoded data frame information produced in step (a).

19. A method according to claim 18, wherein said header control information includes a synchronizing word and at least one of:

bit rate information;

sampling information; and mode information.

20. A method according to claim 18, wherein said error detection data further includes an error correction code.

* * * * *